(12) United States Patent
Arnold et al.

(10) Patent No.: US 11,397,437 B2
(45) Date of Patent: Jul. 26, 2022

(54) SYSTEM WITH A FIRST FLOOR PROCESSING DEVICE AND A SECOND FLOOR PROCESSING DEVICE AS WELL AS A METHOD FOR OPERATING SUCH A SYSTEM

(71) Applicant: Vorwerk & Co. Interholding GmbH, Wuppertal (DE)

(72) Inventors: Hans-Peter Arnold, Kierspe (DE); Thomas Buening, Bochum (DE); Benjamin Fleczok, Essen (DE); Robert Frielinghaus, Bochum (DE); Martin Helmich, Duisburg (DE); Lorenz Hillen, Wuppertal (DE); Christian Holz, Dortmund (DE); Gerhard Isenberg, Cologne (DE); Andrej Mosebach, Bochum (DE); Roman Ortmann, Duisburg (DE); Kevin Schmitz, Duesseldorf (DE); Fabian Vitz, Wuppertal (DE); Niklas Van Teeffelen, Duesseldorf (DE); Uwe Kemker, Wuppertal (DE); Georg Hackert, Wilen bei Wollerau (CH)

(73) Assignee: Vorwerk & Co. Interholding GmbH, Wuppertal (DE)

(*) Notice: Subject to any disclaimer, the term of this patent is extended or adjusted under 35 U.S.C. 154(b) by 240 days.

(21) Appl. No.: 16/745,499

(22) Filed: Jan. 17, 2020

(65) Prior Publication Data
US 2020/0233428 A1    Jul. 23, 2020

(30) Foreign Application Priority Data

Jan. 18, 2019  (DE) .................... 10 2019 101 337.2

(51) Int. Cl.
*G05D 1/02*  (2020.01)
*A47L 11/10*  (2006.01)
*A47L 11/40*  (2006.01)

(52) U.S. Cl.
CPC ........ *G05D 1/0221* (2013.01); *A47L 11/4011* (2013.01); *A47L 2201/04* (2013.01); *G05D 2201/0203* (2013.01)

(58) Field of Classification Search
CPC ........ G05D 1/0221; G05D 2201/0203; G05D 1/028; G05D 1/0274; G05D 1/0236;
(Continued)

(56) References Cited

U.S. PATENT DOCUMENTS

2018/0344114 A1* 12/2018 Scholten ............... A47L 9/2894
2020/0049514 A1*  2/2020 Grandl ................. G05D 1/0088

FOREIGN PATENT DOCUMENTS

| EP | 2 294 960 B1 | 12/2015 |
| WO | 2015/178855 A1 | 11/2015 |

* cited by examiner

*Primary Examiner* — Rodney A Butler
(74) *Attorney, Agent, or Firm* — Collard & Roe, P.C.

(57) ABSTRACT

A system with a first floor processing device and a second floor processing device that is designed to orient and localize itself within an environment based on an area map. The first floor processing device is set up to detect a movement path during a movement by the first floor processing device and transmit information about the detected movement path to the second floor processing device. The second floor processing device has a control and evaluation unit that is set up to analyze the received information and, based upon the movement path detected by the first floor processing device and/or a partial area of the environment not traversed by the movement path, enter a no-go area into the area map which the second floor processing device is not allowed to traverse.

10 Claims, 5 Drawing Sheets

(58) Field of Classification Search
CPC .... G05D 1/0214; G05D 1/0223; G05D 1/024; G05D 1/0242; G05D 1/0251; G05D 1/0255; G05D 1/0285; A47L 11/4011; A47L 2201/04
USPC .......................................................... 701/23
See application file for complete search history.

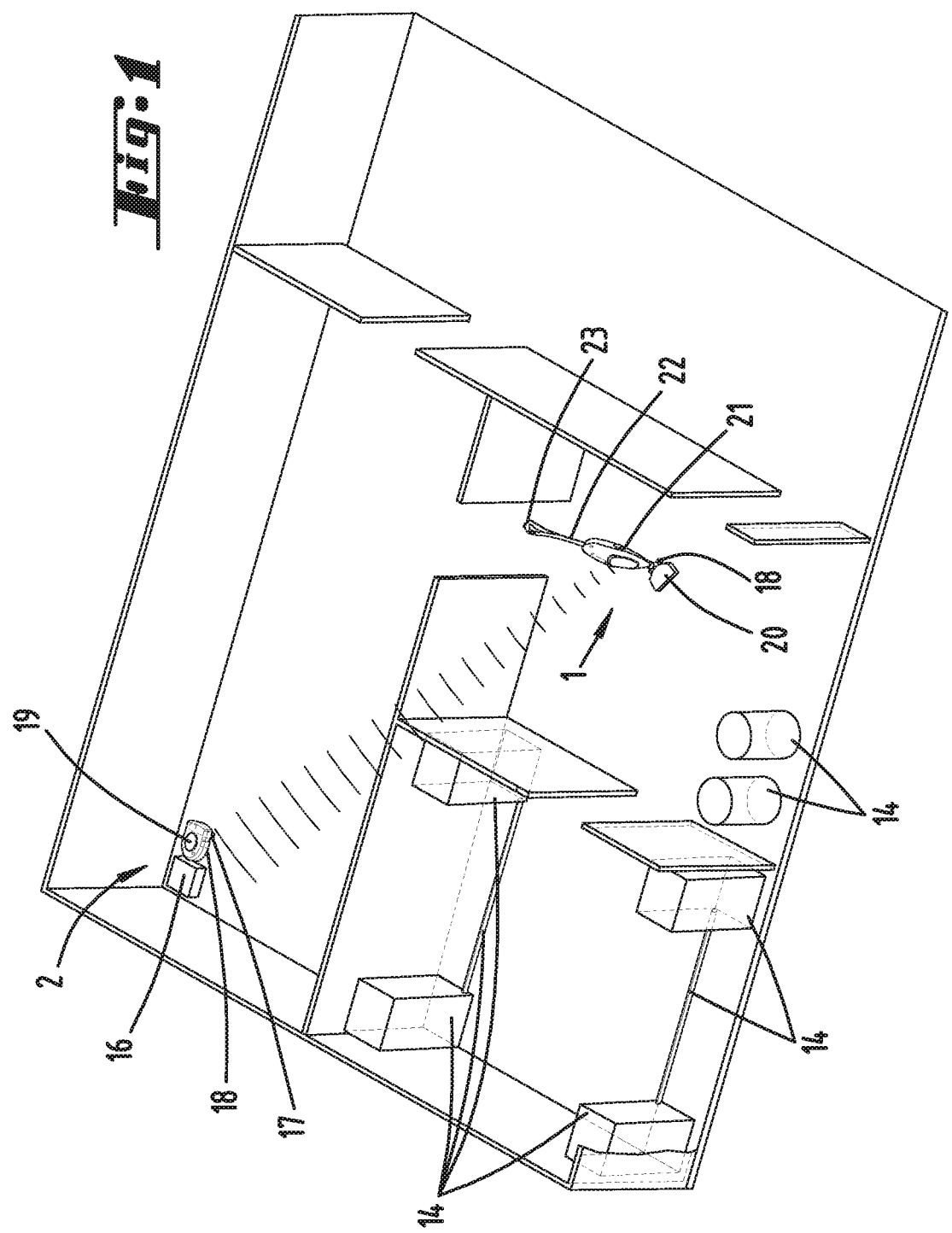

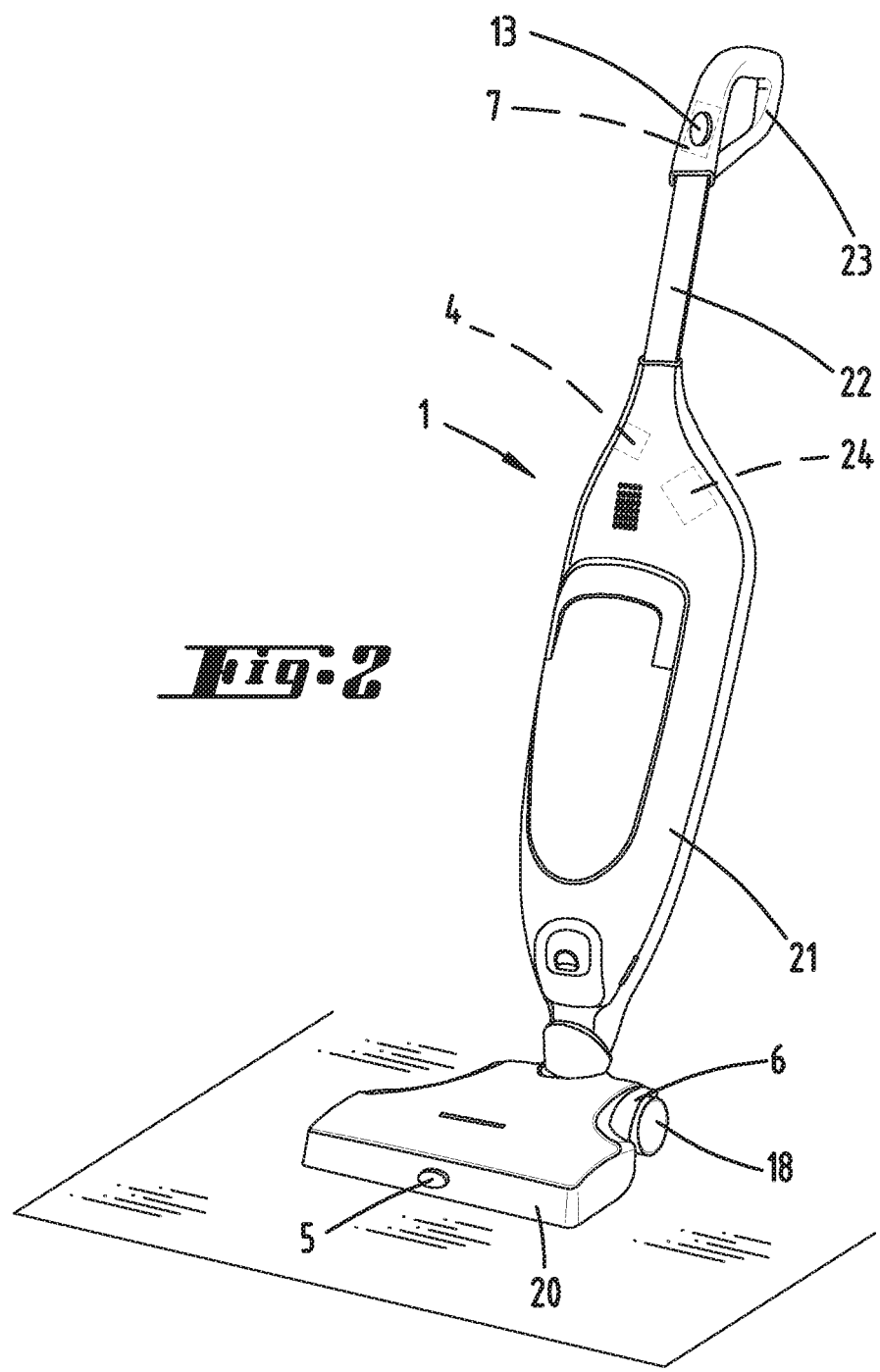

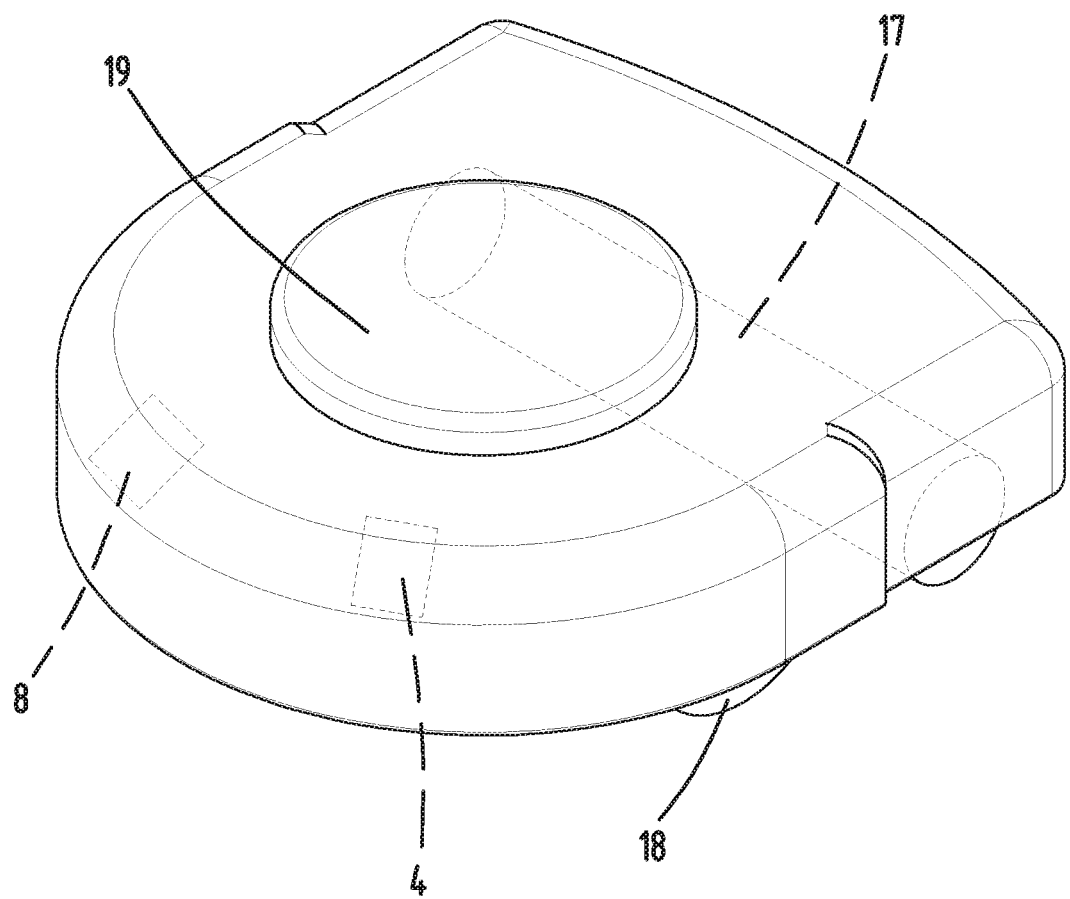

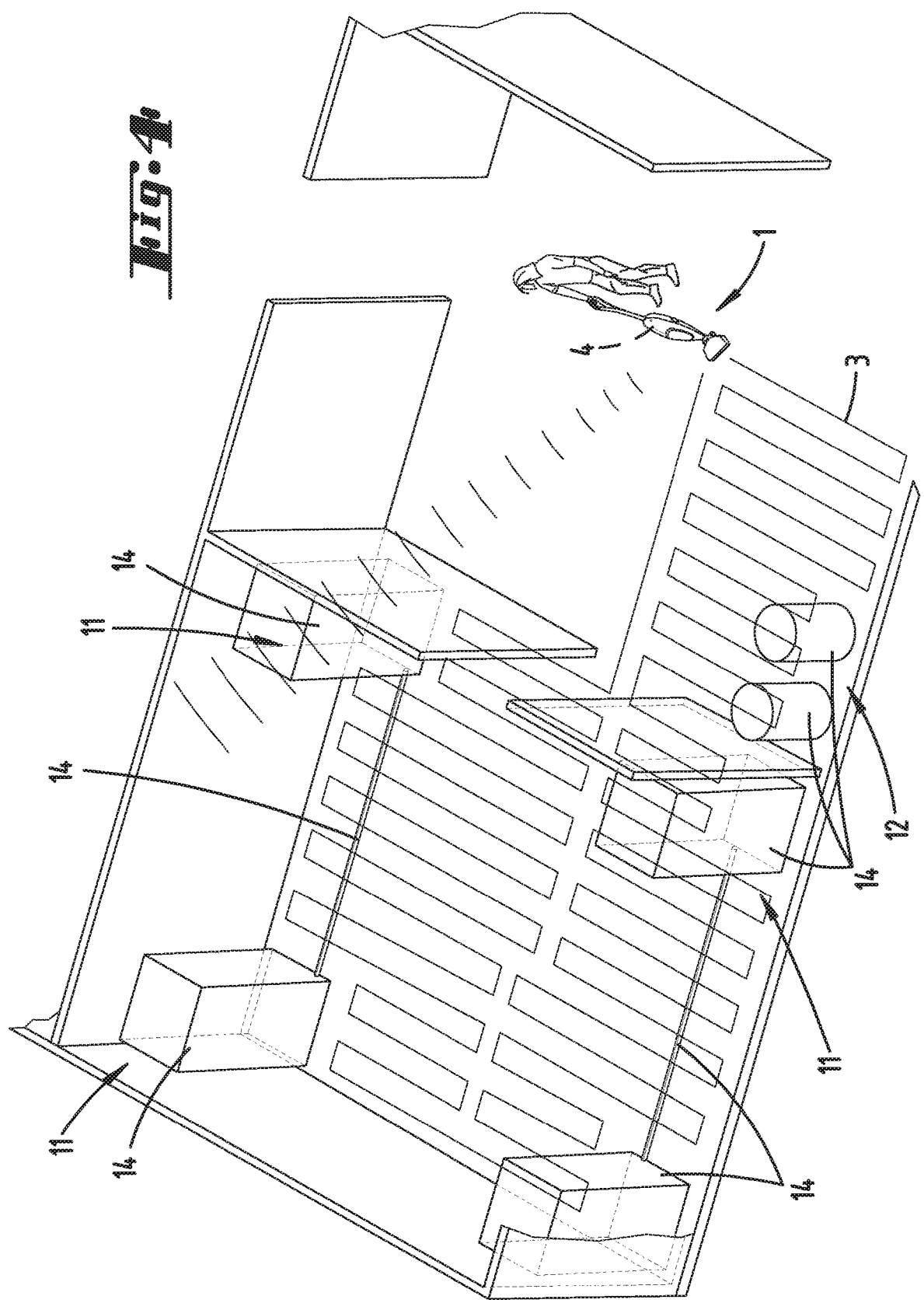

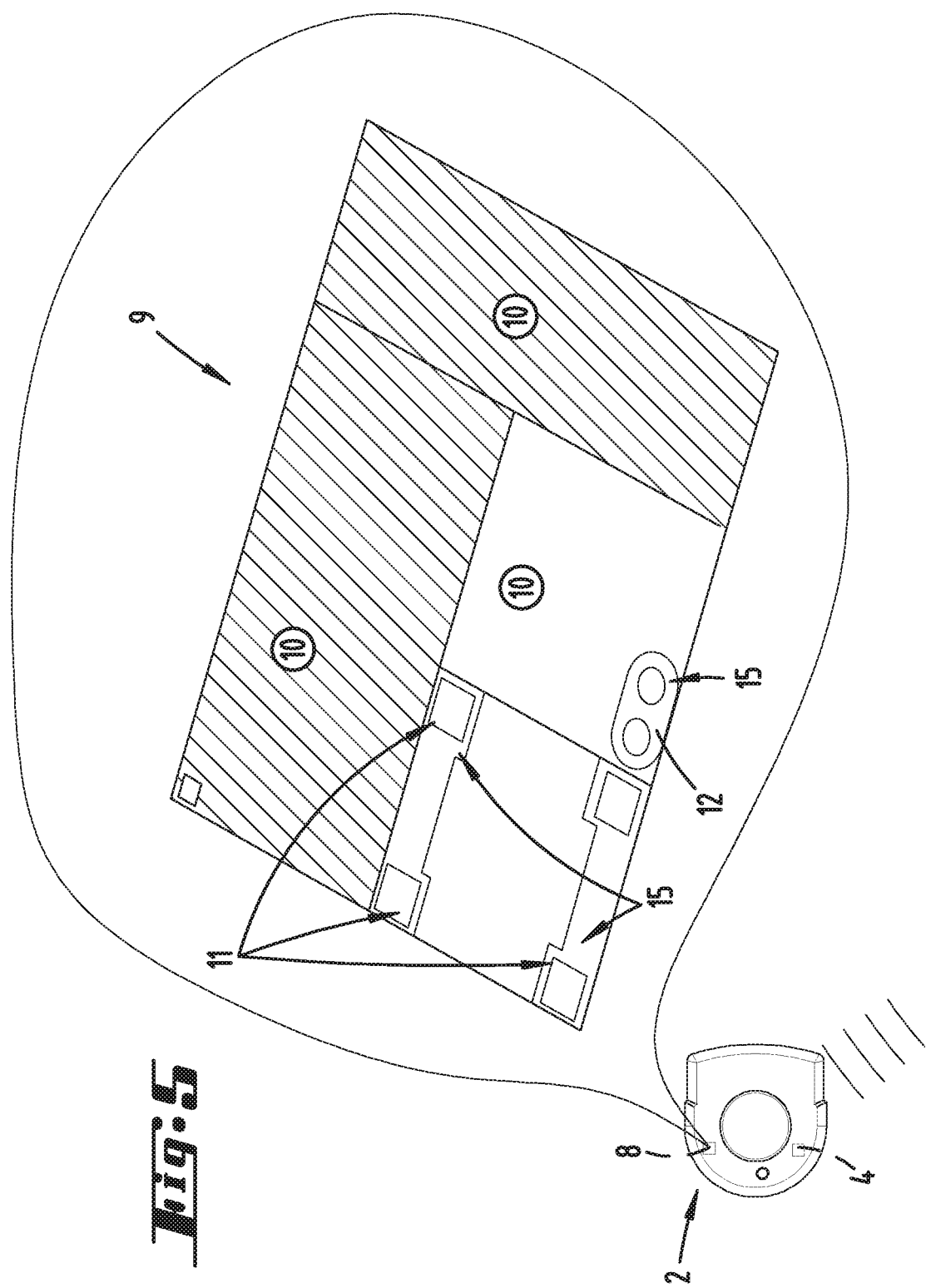

SYSTEM WITH A FIRST FLOOR PROCESSING DEVICE AND A SECOND FLOOR PROCESSING DEVICE AS WELL AS A METHOD FOR OPERATING SUCH A SYSTEM

CROSS-REFERENCE TO RELATED APPLICATIONS

This application claims priority under 35 USC 119 of German Application No. 10 2019 101 337.2, filed on Jan. 18, 2019, the disclosure of which is herein incorporated by reference.

BACKGROUND OF THE INVENTION

1. Field of Technology

The invention relates to a system with a first floor processing device and a second floor processing device, wherein the second floor processing device is designed to orient and localize itself within an environment based on an area map.

In addition, the invention relates to a method for operating such a system, wherein the second floor processing device orients and localizes itself within an environment based on an area map.

2. The Prior Art

Floor processing devices are known in the art as devices that are manually guided by a user or move automatically. In addition, it is also known to operate a system comprised of several floor processing devices within a household, for example, and make complementary use of the advantages offered by manually guided floor processing and automatically operated floor processing.

Within the meaning of the invention, floor processing devices can be cleaning devices such as vacuum cleaners and/or moist wiping devices, polishing devices, waxing devices, grinding devices, lawn mowing devices or the like, for example. Floor processing devices manually guided by a user here are usually characterized by a stalk and/or handle, with which the user can guide the floor processing device over a surface to be processed, for example a floor surface or above-floor surface. The automatically operated floor processing devices are characterized by a navigation unit for automatic orientation and localization within an environment, preferably based on an area map, wherein the automatic floor processing device can move automatically within the environment, navigates based on the area map, and in the process performs any necessary floor processing activities.

For example, European Patent No. EP 2 294 960 B1 discloses a cleaning robot, which is set up to map out rooms and travel on the floor of one or several rooms, wherein the cleaning robot has sensor means for determining the positions of obstacles inside of a mapped room. An area map or environmental data can here be recorded during an exploratory run. The exploratory run is either controlled by the floor processing device itself or manually by a user within the framework of a so-called teach-in, wherein the user of the cleaning device steers the cleaning device through the environment manually, for example by means of a remote control. It is here likewise known to input area boundaries and/or define so-called no-go areas within which the cleaning robot cannot travel, for example via the guided traversal of the environment.

Additionally known from publication WO 2015/178855 A1 is to equip a manually guided floor processing device with a unit that can execute a learning mode and automated mode, wherein the unit records the movements and activities of the manually guided floor processing device in the learning mode, and controls it or some other floor processing device in the automated mode in such a way that the movements and activities recorded previously are again performed by the respective floor processing device.

SUMMARY OF THE INVENTION

Proceeding from the aforementioned prior art, the object of the invention is to further develop an aforementioned system with a first floor processing device and a second floor processing device in such a way that the latter advantageously enhance each other and create added value for the user.

In order to achieve this object, it is initially proposed that, while the first floor processing device is moving, the first floor processing be set up to detect a movement path of the first floor processing device and transmit information about the detected movement path to the second floor processing device. The second floor processing device has a control and evaluation unit that is set up to analyze the received information and, based upon the movement path detected by the first floor processing device and/or a partial area of the environment not traversed by the movement path, enter a no-go area into the area map which the second floor processing device is not allowed to traverse.

According to the invention, the first floor processing device and second floor processing device of the system now work together in such a way that the control and evaluation unit of the second floor processing device uses the information about the movement path collected by the first floor processing device to define so-called no-go areas within its area map, which are not to be traversed by the second floor processing device. The term no-go area denotes a partial area of the environment closed to the movement of the second floor processing device, which the second floor processing device is not allowed to enter. A no-go area is usually defined by virtual area boundaries which the floor processing device is not allowed to cross. The area boundaries are preferably illustrated or stored in the area map as lines. The first floor processing device has a computing unit that is set up to generate a message about the covered movement path of the first floor processing device or untraversed partial areas of the environment lying outside of the movement path, which contains corresponding information for the second floor processing device. The movement path is preferably recorded during a floor processing activity by a detection unit of the first floor processing device, for example by a camera, a laser scanner and/or an inertial sensor, wherein the evaluation of the collected information can take place either already at least partially within the first floor processing device, or subsequently within the second floor processing device that receives the information about the detected movement path from the first floor processing device. The control and evaluation unit of the second floor processing device can process the received information completely automatically, so that the user does not have to take any additional steps to enter one or several no-go areas into the area map of the second floor processing device. Instead, the analysis and generation, processing and/or expansion of the area map are handled completely automatically by the second floor processing device.

The first floor processing device and second floor processing device preferably have corresponding communication modules for wirelessly communicating the information about the movement path and/or floor processing activity. In particular, the floor processing devices can have corresponding WLAN modules, Bluetooth modules or other radio modules that are suitable for transmitting the information about the movement path and/or floor processing activity. As a consequence, it is not required that partial areas of the first or second floor processing devices be physically connected with each other or even that a memory containing the information be transmitted from the first floor processing device to the second floor processing device. Rather, it is sufficient that at least the information about the movement path, i.e., at least the sensor signals of a corresponding detection unit of the first floor processing device, be transmitted to the second floor processing device. For example, this can take place in the form of a message sent by the first floor processing device or even by having the second floor processing device access the information about the movement path or floor processing activity stored in the first floor processing device.

An embodiment proposes that the first floor processing device be a floor processing device guided exclusively manually by a user within an environment and/or that the second floor processing device be an exclusively automatically operated floor processing device. As a consequence, the first floor processing device can be a manually guided floor processing device, which is usually characterized by a stalk and/or handle, which the user can take hold of and push the floor processing device over a surface to be processed. For example, the manually guided device can be a cleaning device, such as an upright vacuum cleaner, a handheld wiping device, a polishing device, a waxing device, a lawnmower or the like. The exclusively manually guided floor processing device usually does not itself have a navigation unit for orienting and localizing the floor processing device within the environment. Rather, the latter is guided through the environment, for example rooms of a home, exclusively by the user, and there completes its floor processing activities along the movement path selected by the user, such as vacuuming, wiping, polishing, waxing, grinding, mowing or the like. The second floor processing device can advantageously be an exclusively automatically operated floor processing device, specifically a floor processing robot, which automatically moves within the environment. For example, these autonomous floor processing devices are known as vacuuming robots, wiping robots, mowing robots or the like. One such independently moving floor processing device usually has a navigation unit, which the second floor processing device can use to orient and localize itself in the environment. For example, the navigation system has a distance sensor like a 3D laser scanner or the like, with which distances to obstacles in the environment are measured. Based upon the measured distances, the automatically operated floor processing device can generate an area map, which contains a layout of the environment, for example a layout of a home or at least of one or several rooms, as well as boundaries of objects, for example pieces of furniture, decorative objects and the like. For example, the area map can be generated by means of a so-called SLAM (simultaneous localization and measurement) algorithm. By combining a floor processing unit that can be guided exclusively manually by a user with an exclusively automatically operable floor processing device, the knowledge, information and intentions of the user utilizing the latter while manually guiding the first floor processing device can also be used for operating the second, automatically operating floor processing device. A floor processing operation performed with the manually guided floor processing device can be recorded in terms of the motion sequence, and transmitted to the autonomous floor processing device, which then in turn sets up one or several no-go areas based on the received data, which the autonomous floor processing device might otherwise traverse and process. Use is thus made of the knowledge that the user does not clean certain partial areas in the environment, for whatever the reason might be. The control and evaluation unit of the second floor processing device concludes from the above that the second floor processing device is also not allowed to traverse and process these partial areas. The second floor processing device thus points to an automatically initiated response to a user intention that the latter expresses by manually using the first floor processing device. Information can likewise be transmitted in the reverse direction, i.e., from the second floor processing device to the first floor processing device, preferably from an automatically operated floor processing device to a manually guided floor processing device. For example, an area map generated by the automatically operated floor processing device can be transmitted to the manually guided floor processing device, so that the latter can use its own sensors to localize itself therein. For example, the manually guided floor processing device can here use sensors that do allow a rough localization within the area map, but not a separate map generation. The interaction between the manually guided floor processing device and automatically operated floor processing device then synergistically enables a manually guided floor processing device to self-localize. In addition, the manually guided floor processing device can advantageously update, supplement and/or change the area map of the second floor processing device. Conceivable here is an enhancement of three-dimensional spatial information, for example relating to above-floor surfaces, which can only be achieved by the manually guided, but not the automatically operated floor processing device. In addition, the manually guided floor processing device can also enhance the information on the area map in relation to other partial areas of the environment not accessible to the automatically operated floor processing device. For example, this can involve partial areas of the environment in which objects that are displaceable and/or can at least be removed by a user rest on the surface or obstacles that are spaced apart from each other by a distance that cannot be reached with the automatically operated floor processing device, but can be reached with the manually guided floor processing device.

In addition, it is proposed that the control and evaluation unit of the second floor processing device be set up to control a movement by the second floor processing device that avoids the no-go area. The second floor processing device does not necessarily travel or operate identically to the first floor processing device, but can rather use a movement path that differs from the movement path of the first floor processing device. While defining the no-go areas based on the movement path of the first floor processing device does leave out partial areas of the environment which the first floor processing device has not traversed, the remaining partial areas that were traversed by the first floor processing device can be traversed or processed in a different sequence, a deviating progression of the movement path, or with other parameters. As a consequence, the second floor processing device can use a movement strategy that differs from the manually guided movement direction and sequence of the user. In particular, for example, the control and evaluation unit of the second floor processing device calculates a movement path that contains partial areas of the environment that are traversed especially rarely. As a result, the second floor processing device can also be used to shorten the floor processing time and/or reduce the energy outlay required for floor processing.

In addition, the control and evaluation unit of the second floor processing device be set up to analyze the movement paths of several chronologically preceding movements of the first floor processing device with the objective of identifying a partial area of the environment that is rarely traversed by the first floor processing device. The frequency with which the partial area is traversed is compared with a defined frequency threshold, and the partial area is defined as a no-go area if the frequency threshold is not reached. Based on the progressions of a plurality of movement paths of past floor processing activities, the control and evaluation unit of the second floor processing device thus recognizes which partial areas of the environment the user has rarely traversed with the manual floor processing device. As a consequence, the second floor processing device leaves out those partial areas of the environment that the user processed rarely in the past by means of the first floor processing device. The second floor processing device is preferably an autonomously operating floor processing device, but can also be a manually guided floor processing device, which then shows the result of a corresponding analysis to a user, for example on a display. The display can show partial areas that are defined as no-go areas and/or information about a preceding frequency with which a respective partial area was traversed in preceding floor processing operations.

In addition, it is proposed that the first floor processing device be further set up to transmit floor processing information to the second floor processing device, wherein the control and evaluation unit of the second floor processing device is set up to analyze the floor processing information and accompanying movement path of at least one chronologically preceding floor processing by the first floor processing device, with the objective of identifying a partial area of the environment that was processed with a device parameter, floor processing parameter and/or device accessory that deviates from defined standard parameters for the first and/or second floor processing device, and wherein the partial area is defined as a no-go area given a deviation from the standard parameters. For example, the control and evaluation unit can determine that the user travels over a partial area of the environment at a special frequency or speed or with a specific pattern of movement. Alternatively and/or additionally, it is possible that, in addition to the movement path, the first floor processing device also transmit information about a used accessory, a device setting during the floor processing operation, or specific process parameters during the floor processing operation to the second floor processing device. The second floor processing device can then evaluate the latter to determine whether the communicated parameters deviate from defined standard parameters of the first and/or second floor processing device, in particular constitute parameters which the second floor processing device cannot use or provide. In this case, the second floor processing device is blocked from traversing the respective partial area, so that this partial area is only accessible with the first floor processing device, for example by means of a floor processing device manually guided by the user, which enables a special processing operation desired there, for example a floor cleaning with special settings, such as an extremely low suction power level, an especially low speed of movement, or by means of a special attachment.

In addition, the control and evaluation unit of the second floor processing device can be set up to analyze the movement paths, and additionally in particular floor processing information of several chronologically preceding movements by the first floor processing device, with the objective of identifying a partial area of the environment having an obstacle that was displaced and/or overcome by the first floor processing device, wherein the frequency with which such an obstacle was detected in a specific partial area is compared with a defined frequency threshold, and wherein the partial area is defined as a no-go area if the frequency threshold is exceeded. In this embodiment, the information of the first floor processing device to the second floor processing device contains not only the movement path traversed by the first floor processing device, but rather also information about disruptive objects that were located on the movement path, for example. Such disruptive objects can be displaceable obstacles like cables, lighter decorative objects of the like and/or obstacles that can be overcome by the first floor processing device, for example likewise cables, but also carpet edges, door thresholds or the like. Since the second, in particular automatically operated floor processing device might not be able to itself displace or overcome displaced and/or overcome obstacles, partial areas of the environment that often contained such a disruptive object in the past are defined as a no-go area, so that the second floor processing device is blocked from traversing this partial area of the environment, or avoids it.

A special embodiment proposes that the first floor processing device have an activating element that can be activated by a user, with which the user can mark positions of the movement path during a movement by the first floor processing device, wherein the control and evaluation unit of the second floor processing device is set up to analyze the movement path of at least one chronologically preceding movement by the first floor processing device, with the objective of identifying a partial area of the environment relative to which a user of the first floor processing device previously left a marking, wherein the marked partial area is defined as a no-go area. In this embodiment, the first floor processing device, which in particular is an exclusively manually guided floor processing device, has an activating element, which the user can activate to mark specific positions or sections of the movement path allocated to specific partial areas of the environment as untraversable by the second floor processing device. The marked partial areas are thus defined as no-go areas, which the second floor processing device is not allowed to enter. In addition, the user can transmit information about the reason for the marking, for example that a specific accessory, specific device setting or the like of the floor processing device is required for processing the marked partial area, manually via an input unit of the first floor processing device or via an external terminal, which preferably communicates wirelessly with the first floor processing device, in particular by means of a mobile phone, laptop, tablet computer or the like. For example, this information can then also be recorded in an area map of the second floor processing device. The partial area or position of the movement path marked by means of the activating element can advantageously be synchronized with no-go areas automatically recognized by the control and evaluation unit of the second floor processing device, so as to verify the veracity of the automatically generated no-go area. The second floor processing device thus recognizes partial areas that were not traversed by the first floor processing device, and compares them with information manually transmitted by the user about partial areas of the environment not to be traversed, so that the area map of the second floor processing device preferably only designates those partial areas as traversable that lie outside of the no-go areas.

In addition, it can be provided that the control and evaluation unit of the second floor processing device be set up to request a confirmation by the user of the second floor processing device before defining a partial area of the environment as a no-go area. In all aforementioned cases, the user can additionally also provide a confirmation that a specific partial area is to be defined as a no-go area. For example, this can involve a query to the user and a release by the user in an application installed on a floor processing device or also on an external terminal, for example a mobile phone, a tablet computer or a similar device.

In addition, it is proposed that the first floor processing device have at least one detection unit from the following group: Camera, laser scanner, floor sensor for detecting a type of a surface to be processed, dirt sensor for detecting a type or a degree of contamination of the surface to be processed, sensor for determining the power of a drive motor, distance sensor, inertial sensor, time sensor, contact sensor. One or several of these aforementioned units are designed to receive detection signals, which can be processed into information for the second floor processing device. In this sense, the first floor processing device and/or the second floor processing device can have an evaluation unit, which is set up to determine at least one of the following pieces of information from the detection signals of the detection unit: A movement path of the first floor processing device in the environment, an area map, a processing status of a partial area of the environment, a position of a partial area that has been processed, has not been processed and/or cannot be traversed by the first floor processing device, a floor type, a contamination type, a contamination level, an accessory used by the first floor processing device for floor processing, 3D area information and/or obstacle information. For example, the camera and/or laser scanner are used to determine the position of the first floor processing device within the environment, as well as to determine the position of obstacles. To this end, a so-called SLAM (simultaneous localization and measurement) algorithm can typically be used. The sensor data of the camera or laser scanner make it possible to detect a movement path of the manually guided floor processing device in the environment. In addition, the sensor data can be used to generate an area map for the manually guided and/or the automatically operated second floor processing device, which has partial areas of the environment that have been processed, have not been processed, i.e., were omitted and/or not accessible during the floor processing activity, if necessary to include information about the number of repetitions that the manually guided floor processing device has performed or attempted so as to complete the floor processing activity. The manually guided floor processing device can further have a floor sensor for recognizing a floor type. For example, such a floor sensor can comprise a camera or a sensor for determining the power of a drive motor. For example, it is possible to detect the power consumption of a motor used for driving a fan motor, a driving wheel of a rotating cleaning roller, an oscillating wiping element or the like. For example, a rotating bristle roller of the manually guided floor processing device requires a higher power consumption by the driving motor on a carpeted floor or a carpet than on a hard floor comprised of tiles or floorboards.

In this way, the type of a floor can then be inferred. For example, a dirt sensor of the floor processing device for detecting the type and/or level of contamination of the surface to be processed can also include a camera. If the manually guided floor processing device is equipped with distance sensors, for example infrared sensors and/or ultrasound sensors, the latter are used to ascertain the distance to obstacles present within the environment. On the one hand, this makes it possible to prevent the first floor processing device and then later the second floor processing device from hitting a room boundary and/or an object within the environment. The device can preferably maintain a specific safety distance from the obstacle or approach it especially slowly. On the other hand, the information about an obstacle can also be used to recognize movable disruptive objects or disruptive items like cables, socks, vases, flowers, toys or the like within the environment, and for example to prompt a user to remove them from the partial area of the environment to be processed. If necessary, a camera can additionally be used for purposes of object recognition via digital image processing. The manually guided floor processing device can further have a unit for recognizing a specific accessory connected with the floor processing device, in particular an attachment. For example, such an accessory can be a specific floor processing element or a removable attachment. A floor processing element can be a cleaning element, such as a bristle roller, a wiping element or the like, for example. The accessory can have a code that clearly identifies the accessory, wherein the manually guided floor processing device correspondingly has a detection unit set up to recognize this code and differentiate the detected accessory from other accessories accordingly. As a consequence, the information transmitted by the manually guided floor processing device to the automatically moving floor processing device can also contain an indication as to which accessory was used for the floor processing activity, so that the automatically operated floor processing device can further also work or be equipped with a corresponding accessory. It can here especially advantageously also be considered whether the floor processing device is equipped for processing hard floor surfaces or carpeted floors or carpets. If the manually guided floor processing device further has an inertial sensor, for example, a three-dimensional movement path of this floor processing device within the environment can also be followed, among other things. For example, an inertial sensor can be a gyroscope. This makes it possible to obtain 3D information, for example which contains processed stories of a building, steps of a staircase and/or above-floor surfaces of a room, for example windowsills, surfaces of furniture items or the like. In addition, a time sensor of the manually guided floor processing device can deliver information about the timespan within which the user has performed a floor processing activity or several floor processing activities by means of the manually guided floor processing device. The chronological progression and/or a speed of a floor processing operation can thus be ascertained. In addition, corresponding sensor data can be allocated to different points in time. This makes it possible to match and synchronize the chronological progression of the floor processing operation with detected sensor data of the detection unit of the floor processing device. This chronological progression of the floor processing operation can then be correspondingly reproduced by the automatically operated floor processing device, for example so that a specific timespan is used for specific floor processing activities and/or the automatically operated floor processing device travels just as fast within the environment as the user did with the manually guided floor processing device. For example, a contact sensor provided on the manually guided floor processing device can further be used by a user to mark a specific point in time during the floor processing operation and/or the location of the environment via activation. For example, the contact sensor can be activated with an activation element. In particular, activation can register various features, such as briefly pressing, prolonged pressing or repeated activations, which characterize varying events. The activation element can be a pushbutton or the like.

Finally, the invention also relates to a method for operating a system of the aforementioned kind with a first floor processing device and a second floor processing device, wherein the second floor processing device orients and localizes itself within an environment based on an area map, wherein the first floor processing device detects a movement path of the first floor processing device during a movement by the first floor processing device, and transmits information about the detected movement path along with in particular additional floor processing information to the second floor processing device, wherein a control and evaluation unit of the second floor processing device analyzes the received information and, based on the movement path detected by the first floor processing device and/or a partial area of the environment not traversed by the movement path, enters a no-go area into the area map which the second floor processing device is not allowed to traverse. The method according to the invention involves transmitting information about a movement path of a first floor processing device to a second floor processing device, which thereupon defines no-go areas, for example which comprise partial areas of the environment located outside of the movement path. The second floor processing device is not allowed to traverse these defined no-go areas during a floor processing activity. The inventive features and advantages of the method are as described in more detail previously in relation to the system according to the invention. To avoid repetition, reference is here made to the above statements about the system according to the invention.

BRIEF DESCRIPTION OF THE DRAWINGS

The invention will be explained in greater detail below based on exemplary embodiments. In the drawings:

FIG. 1 is an environment with a system comprised of a first floor processing device and a second floor processing device, FIG. 2 is a magnified view of the first floor processing device, FIG. 3 is a magnified view of the second floor processing device, FIG. 4 is a movement path of the first floor processing device through a partial area of the environment shown on FIG. 1, and FIG. 5 is the second floor processing device with an area map in which no-go areas are defined.

DETAILED DESCRIPTION OF THE EMBODIMENTS

FIG. 1 schematically depicts the layout of a home with several rooms. Located in the home is a system according to the invention comprised of a first floor processing device 1 guided exclusively manually by a user and a second floor processing device 2 operated exclusively automatically. For example, the first floor processing device 1 is here a handguided vacuum cleaner, which is described in more detail in relation to FIG. 2. For example, the automatically operated floor processing device 2 is here a vacuuming robot, which is depicted in greater detail in relation to FIG. 3. The environment of the floor processing devices 1, 2 contains common room boundaries such as walls and obstacles 14, which a user can or even cannot displace. For example, obstacles 14 that can be easily removed by a user include flowerpots, vases, small pieces of furniture or the like. For example, obstacles 14 that are not that easy to displace or remove include heavy pieces of furniture, pianos, large loudspeakers or the like. Located in the environment here is a base station 16 for the automatically operated second floor processing device 2. This base station 16 has apparatuses and means for performing service activities on the automatically operated second floor processing device 2 or possibly other floor processing devices 1, 2. For example, the service activities include charging an accumulator of a floor processing device 1, 2, emptying a dust collection chamber of a floor processing device 1, 2, cleaning a floor processing element 17 of a floor processing device 1, 2 or the like.

The floor processing devices 1, 2 will now be described in more detail. According to FIGS. 1 and 2, the floor processing device 1 manually guided by a user has a base device 21 along with a floor nozzle 20 detachably connected with the base device 21. For example, the floor nozzle 20 here involves a suction nozzle with a cleaning brush (not shown in any greater detail), which forms a floor processing element 17. The floor nozzle 20 has wheels 18, so as to move the floor processing device 1 with a low overall resistance over a floor to be cleaned. To this end, the wheels 18 or also the floor processing element 17 can be driven by a motor, so as to support the movement of the floor processing device 1 and make it easier for a user to handle the floor processing device 1. The base device 21 has a stalk 22 with a handle 23. The handle 23 can be provided with a switch (not shown in more detail here), with which the user can turn the floor processing device 1 on and off, and potentially set varying power levels or the like. The handle 23 here also has an activating element 13, which is operatively connected with a detection unit 7, specifically a contact sensor. The activating element 13 can be depressed by a user, so that the contact sensor registers a corresponding contact signal. The function of the activating element 13 or contact sensor will be explained in more detail later. The floor processing device 1 has additional detection units 5, 6, which include a camera arranged on the floor nozzle 20 (reference number 5). An inertial sensor is likewise allocated to the wheels 18 of the floor nozzle 20 as an additional detection unit 6. The camera records images of the environment, which contain the obstacles 14 on the one hand and the floor surface to be cleaned on the other, for example. The inertial sensor detects the wheel revolutions of the wheels 18, making it possible to infer a stretch covered by the floor processing device 1 and a directional change of the floor processing device 1 during a movement through the environment. The base device 21 of the floor processing device 1 further has a computing unit 24, which is set up to at least partially process the signals of the detection units 5, 6, 7 in such a way that information can be put together via the detection signals of the detection units 5, 6, 7 and then transmitted by means of a communication module 4 of the floor processing device 1 to the second floor processing device 2 of the system. For example, the communication module 4 is here a WLAN module, which allows wireless communication between the floor processing devices 1, 2 of the system.

The automatically operated second floor processing device 1 shown in more detail on FIG. 3 has motor-driven wheels 18 as well as a floor processing element 17, for example which is here designed as a rotating bristle roller, the longitudinal extension of which is aligned essentially horizontal to a floor to be cleaned. The second floor processing device 2 likewise has a communication module 4 designed as a WLAN module, so as to be able to receive the information of the first floor processing device 1. In addition, the second floor processing device 2 has an evaluation unit 8, which is set up to evaluate the information received from the first floor processing device 1 and utilize it for floor processing. To allow the second floor processing device 2 to independently move within the environment, it has a navigation unit with a laser scanner 19, which preferably can detect distances to obstacles 14 and boundaries of the rooms in a home in a 360° angle range. The evaluation unit 8 of the floor processing device 2 processes these distance data into an area map 9 exemplarily depicted on FIG. 5, which contains a layout of the environment, locations of obstacles 14, the position of the base station 16 and the like. The area map 9 is used to navigate and self-localize the second floor processing device 2 within the environment. For example, in order to generate the area map 9, the floor processing device 2 can use a so-called SLAM (simultaneous localization and measurement) algorithm.

The invention will now be described in more detail with reference to FIGS. 4 and 5. The following explanations only present an example for the use of a system according to the invention. It here goes without saying that the floor processing devices 1, 2 can also be configured differently, i.e., for example that they need not exclusively be vacuum cleaners, but rather can also be wiping devices, polishing devices or the like, for example. Furthermore, apart from the depicted floor processing devices 1, 2, the system can also have a plurality of additional floor processing devices 1, 2 or other devices, such as service robots, monitoring robots or the like, which do not perform any floor processing activities.

According to a possible embodiment, the invention functions in such a way that the user pushes the first, e.g., here manually guided, floor processing device 1 through the environment shown on FIGS. 1 and 4. As depicted on FIG. 4, in doing so he or she follows the movement path 3, which maintains a distance from the obstacles 14, here for example four loudspeakers arranged in the corners of the room, that is sufficient as visually judged by the user. However, the user passes over the cables running between the loudspeakers, which likewise constitute obstacles 14, with the manually guided first floor processing device 1. As evident, the movement path 3 thus leaves out the room corners, but crosses the cables lying on the floor. After the floor processing operation has concluded, the first floor processing device 1 uses its communication module 4 to transmit a message to the second, here automatically operated floor processing device 2. The second floor processing device 2 receives the message by means of its communication module 4, and analyzes the information contained therein, which contains the progression of the movement path 3 of the first floor processing device 1. There can even be additional information, for example floor processing information about a device parameter used by the first floor processing device 1 during the floor processing operation, floor processing parameters and/or a specific accessor connected with the first floor processing device 1. For example, the device parameter can relate to a type of the first floor processing device 1, a motor built into the latter or the like. For example, an imparted floor processing parameter can be a blower power set during the floor processing of the first floor processing device 1, a movement speed or the like. The accessory can be a specific attachment, such as a floor nozzle 20, or a specific floor processing element 17 or the like.

As shown in FIG. 5, the second, automatically operated floor processing device 2 has an area map 2, which was generated beforehand during an exploratory run or during a floor processing activity. The area map is now supplemented to include no-go areas 15, which the control and evaluation unit 8 of the second floor processing device 2 establishes as areas not to be traversed by the second floor processing device 2. To this end, the control and evaluation unit 8 analyzes the information received from the first floor processing device 1, specifically in particular the movement path 3 followed by the first floor processing device 1, and recognizes which partial areas 11, 12 of the environment were not traversed by the first floor processing device 1. These partial areas 11, 12 are marked by the control and evaluation unit 8 as blocked areas, which the second floor processing device 2 does not traverse during a subsequent automatically controlled floor processing operation. In addition, the control and evaluation unit 8 of the second floor processing device 2 recognizes that the environment also contains obstacles 14, specifically here the cables between the loudspeakers, which the user traversed with the first floor processing device 1. The message of the first floor processing device 1 to the second floor processing device 2 can correspondingly contain additional information about the fact that obstacles 14 were traversed. To this end, for example, the detection unit 6 of the first floor processing device 1 can deliver information about the first floor processing device 1 lifting from the floor surface. Based on this height information, the control and evaluation unit 8 of the second floor processing device 2 recognizes that the cables constitute an obstacle 14 that cannot be overcome by the second floor processing device 2, and likewise marks the corresponding partial areas 11 as no-go areas 15 for the second floor processing device 2; even though the second floor processing device 2 might even be able to overcome or push aside the latter, there exists a certain risk that the second floor processing device 2 would become stuck on these obstacles 14.

In a special embodiment, the control and evaluation unit 8 analyzes information about several preceding floor processing activities of the first floor processing device 1 in a defined part of the environment to determine which partial areas 11, 12 of the environment were processed relatively rarely by the first floor processing device 1. In order to precisely define a rare floor processing operation, the control and evaluation unit 8 compares the frequency with which the partial area 11, 12 is traversed by the first floor processing device 1 with the frequency thresholds defined for these partial areas 11, 12. If it is determined that the first floor processing device 1 rarely enters into this partial area 11, 12 in this sense, the control and evaluation unit 8 of the second floor processing device 2 concludes that the user of the manually guided first floor processing device 1 has reasons for not processing this partial area 11, 12 that often, for example because a distance between obstacles present there is too small for the first floor processing device 1 to pass through, or because an obstacle 14 must be traversed, since sensitive objects are arranged in this partial area 11, 12 or the like. The control and evaluation unit 8 then itself defines this partial area 11, 12 in the area map 9 as a no-go area 15.

In addition, the control and evaluation unit 8 can analyze information from the first floor processing device 1 about several chronologically preceding floor processing activities to find out whether the first floor processing device 1 has often displaced and/or overcome an obstacle 14 in a specific partial area 11, 12. If this situation has arisen more frequently in the past, and the frequency exceeds a defined frequency threshold, the control and evaluation unit 8 likewise defines this partial area 11, 12 as a no-go area 15.

In addition, the control and evaluation unit 8 can also evaluate signals that a user of the first floor processing device 1 sent manually by pressing the activating element 13 arranged on the first floor processing device 2. The detection unit 7 designed as a contact sensor detects the pressing of the activating element 13, and transmits the spatial positions of the movement path 3 at which the user pressed the activating element 13 along with the information about the movement path 3 to the second floor processing device 2. The control and evaluation unit 8 of the second floor processing device 2 can thereupon identify a partial area 11, 12 of the environment in which the user marked a position of the movement path 3 during the movement of the first floor processing device 1. The partial area 11, 12 in which the marked position lies is then defined as a no-go area 15, wherein the user can preferably establish how large the no-go area 15 around the marked position of the movement path 3 is to be. For example, the marked position can be a position in which a cable lies on the floor to be processed, and while it can be overcome by the first floor processing device 1, the second floor processing device 2 is not to approach it.

In all aforementioned examples, it can further be provided that the user must provide a confirmation before automatically defining a partial area 11, 12 as a no-go area 15. To this end, the control and evaluation unit 8 of the second floor processing device 2 can initially send a message to the user that a no-go area 15 is to be defined in a specific partial area 11, 12, whereupon the user must then confirm or deny the latter, or modify the position of the no-go area 15, for example. For example, the confirmation can be requested by the second floor processing device 2, for example on a display of the floor processing device 2. Alternatively and especially preferably, however, the user receives a corresponding prompt, for example, on an external terminal like a mobile phone, a tablet computer or the like via an application installed on the external terminal.

After entering the no-go areas 15 into the area map 9, the second floor processing device 2 observes the no-go areas 15 marked in the area map 9 while moving to process the floor of the environment. It can here plan a movement path 3 in the environment based on any traversing strategy desired, as long as this movement path 3 does not pass through a no-go area 15 or at least contact the latter. It is here not necessary that the second floor processing device 2 travel identically along the movement path 3 also followed by the user by means of the first floor processing device 1, even though this might of course be possible in some cases. It is recommended that the control and evaluation unit 8 of the second floor processing device 2 follow a movement path 3 that is especially efficient in terms of time and energy.

REFERENCE LIST

1 First floor processing device
2 Second floor processing device
3 Movement path
4 Communication module
5 Detection unit
6 Detection unit
7 Detection unit
8 Control and evaluation unit
9 Area map
10 Processing status
11 Partial area
12 Partial area
13 Activating element
14 Obstacle
15 No-go area
16 Base station
17 Floor processing element
18 Wheel
19 Laser scanner
20 Floor nozzle
21 Base unit
22 Stalk
23 Handle
24 Computing unit

What is claimed is:

1. A system comprising:
a first floor processing device, and
a second floor processing device configured to orient and localize itself within an environment based on an area map,
wherein the first floor processing device is a floor processing device guided exclusively manually by a user within the environment and wherein the second floor processing device is an exclusively automatically operated floor processing device,
wherein the second floor processing device is configured to transmit the area map to the first processing device,
wherein the first floor processing device is configured to localize itself in the area map by using its own sensors and to detect a movement path of the first floor processing device during its movement and transmit information about the detected movement path on the basis of the area map to the second floor processing device,
wherein the second floor processing device has a control and evaluation unit that is configured to analyze the received information and, based upon the movement path detected by the first floor processing device and a partial area of the environment not traversed by the movement path, enter a no-go area into the area map which the second floor processing device is not allowed to traverse.

2. The system according to claim 1, wherein the control and evaluation unit of the second floor processing device is configured to control a movement by the second floor processing device that avoids the no-go area.

3. The system according to claim 1, wherein the control and evaluation unit of the second floor processing device is configured to control the second floor processing device deviating from the movement path of the first floor processing device.

4. The system according to claim 1, wherein the control and evaluation unit of the second floor processing device is configured to analyze the movement paths of several chronologically preceding movements by the first floor processing device, to identify a partial area of the environment which is rarely traversed by the first floor processing device, wherein a frequency with which the partial area was traversed is compared with a defined frequency threshold, and wherein the partial area is defined as the no-go area if the frequency threshold is not reached.

5. The system according to claim 1, wherein the first floor processing device is configured to transmit floor processing information to the second floor processing device, wherein the control and evaluation unit of the second floor processing device is configured to analyze the floor processing information and accompanying movement path of at least one chronologically preceding floor processing by the first floor processing device to identify a partial area of the environment that was processed with a device parameter, floor processing parameter and/or device accessory that deviates from defined standard parameters for the first and/or second floor processing device, and wherein the partial area is defined as the no-go area given a deviation from the standard parameters.

6. The system according to claim 1, wherein the control and evaluation unit of the second floor processing device is configured to analyze the movement paths, and floor processing information of several chronologically preceding movements by the first floor processing device to identify a partial area of the environment having an obstacle that was displaced and/or overcome by the first floor processing device, wherein a frequency with which such an obstacle was detected in a specific partial area is compared with a defined frequency threshold, and wherein the partial area is defined as the no-go area if the frequency threshold is exceeded.

7. The system according to claim 1, wherein the first floor processing device has an activating element that is configured to be activated by a user to mark positions of the movement path during a movement by the first floor processing device, wherein the control and evaluation unit of the second floor processing device is configured to analyze the movement path of at least one chronologically preceding movement by the first floor processing device to identify a partial area of the environment relative to which a user of the first floor processing device previously left a marking, wherein a marked partial area is defined as the no-go area.

8. The system according to claim 1, wherein the control and evaluation unit of the second floor processing device is configured to request a confirmation by the user of the second floor processing device before defining a partial area of the environment as the no-go area.

9. The system according to claim 1, wherein the first floor processing device has at least one detection unit selected from the group consisting of: camera, laser scanner, floor sensor for detecting a type of a surface to be processed, dirt sensor for detecting a type or a degree of contamination of the surface to be processed, sensor for determining the power of a drive motor, distance sensor, inertial sensor, time sensor, and contact sensor.

10. A method for operating a system with a first floor processing device and a second floor processing device, wherein the first floor processing device is a floor processing device guided exclusively manually by a user within the environment and wherein the second floor processing device is an exclusively automatically operated floor processing device, wherein the second floor processing device orients and localizes itself within an environment based on an area map, comprising the following steps:
    transmitting, by the second floor processing device, the area map to the first processing device,
    the first floor processing device localizing itself in the area map by using its own sensors,
    detecting with the first floor processing device a movement path of the first floor processing device during its movement,
    transmitting, on the basis of the area map, information about the detected movement path and floor processing information to the second floor processing device,
    analyzing with a control and evaluation unit of the second floor processing device the received information, and
    based upon the movement path detected by the first floor processing device and a partial area of the environment not traversed by the movement path, entering a no-go area into the area map which the second floor processing device is not allowed to traverse.

* * * * *